United States Patent
Monson et al.

(10) Patent No.: US 6,382,603 B1
(45) Date of Patent: May 7, 2002

(54) RIDGED ELASTOMER MOUNT

(75) Inventors: Robert James Monson, St. Paul; Trevor J. McCollough, Minneapolis, both of MN (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 09/779,755

(22) Filed: Feb. 8, 2001

(51) Int. Cl.$^7$ ............................... F16F 3/00
(52) U.S. Cl. ............ 267/80; 267/140.4; 267/294; 248/562; 248/633; 248/638
(58) Field of Search ............... 267/80, 81, 83, 267/87, 292, 294, 75, 130, 140.4, 141.1, 182; 248/614, 618, 619, 620, 621, 632, 633, 562, 568, 570, 599, 615, 636, 638, 658, 346.4; 428/465

(56) References Cited

U.S. PATENT DOCUMENTS

| | | | | |
|---|---|---|---|---|
| 123,999 A | * | 2/1872 | King ..................... | 267/141 |
| 2,009,059 A | * | 7/1935 | Brennan et al. ............... | 267/63 |
| 2,184,482 A | * | 12/1939 | Austin et al. ................... | 154/44 |
| 2,534,137 A | * | 12/1950 | Lewis ..................... | 154/44 |
| 2,776,101 A | * | 1/1957 | McDermott ................... | 248/24 |
| 3,026,224 A | * | 3/1962 | Rogers, Jr. ................... | 154/44 |
| 3,311,331 A | * | 3/1967 | Steimen ..................... | 248/22 |
| 3,345,245 A | * | 10/1967 | Hanusa ................... | 161/119 |
| 4,002,315 A | * | 1/1977 | Van Goubergen ............. | 248/24 |
| 4,025,006 A | * | 5/1977 | Saveker ..................... | 428/594 |
| 4,059,254 A | | 11/1977 | Fielding-Russel et al. .. | 267/140 |
| 4,150,850 A | * | 4/1979 | Doerfling ................. | 296/137 A |
| 4,203,195 A | * | 5/1980 | Nakae et al. .................. | 29/505 |
| 4,273,213 A | * | 6/1981 | Munz ..................... | 181/207 |
| 4,348,015 A | * | 9/1982 | Domer ..................... | 267/140.4 |
| 4,648,554 A | * | 3/1987 | McQueen ................... | 238/283 |
| 4,803,112 A | * | 2/1989 | Kakimoto et al. .......... | 428/161 |
| 5,030,490 A | * | 7/1991 | Bronowicki et al. ....... | 428/36.4 |
| 5,330,165 A | * | 7/1994 | Van Goubergen ........... | 267/141 |
| 5,331,750 A | * | 7/1994 | Sasaki et al. ................... | 36/28 |
| 5,356,702 A | * | 10/1994 | Harrison ..................... | 428/236 |
| 5,766,720 A | | 6/1998 | Yamagishi et al. ........... | 428/71 |
| 6,147,587 A1 | * | 1/2001 | Figge, Sr. ................... | 428/178 |
| 6,332,027 B1 | * | 12/2001 | Guilloud et al. ........... | 381/71.1 |

* cited by examiner

Primary Examiner—Paul N. Dickson
Assistant Examiner—Benjamin A Pezzlo
(74) Attorney, Agent, or Firm—Patrick M. Hogan; Glenn W. Bowan

(57) ABSTRACT

A shock isolator comprising a first plate having a set of ridges and grooves extending there along and a second plate having a complementary set of ridges and grooves with an elastomeric sheet sandwiched between the two plates so that when a compressive force is applied to the two plates the elastomeric sheet resist the forces through compression resistance, tension resistance and shear resistance to provide both static support and shock isolation to an object supported by the shock isolator.

14 Claims, 2 Drawing Sheets

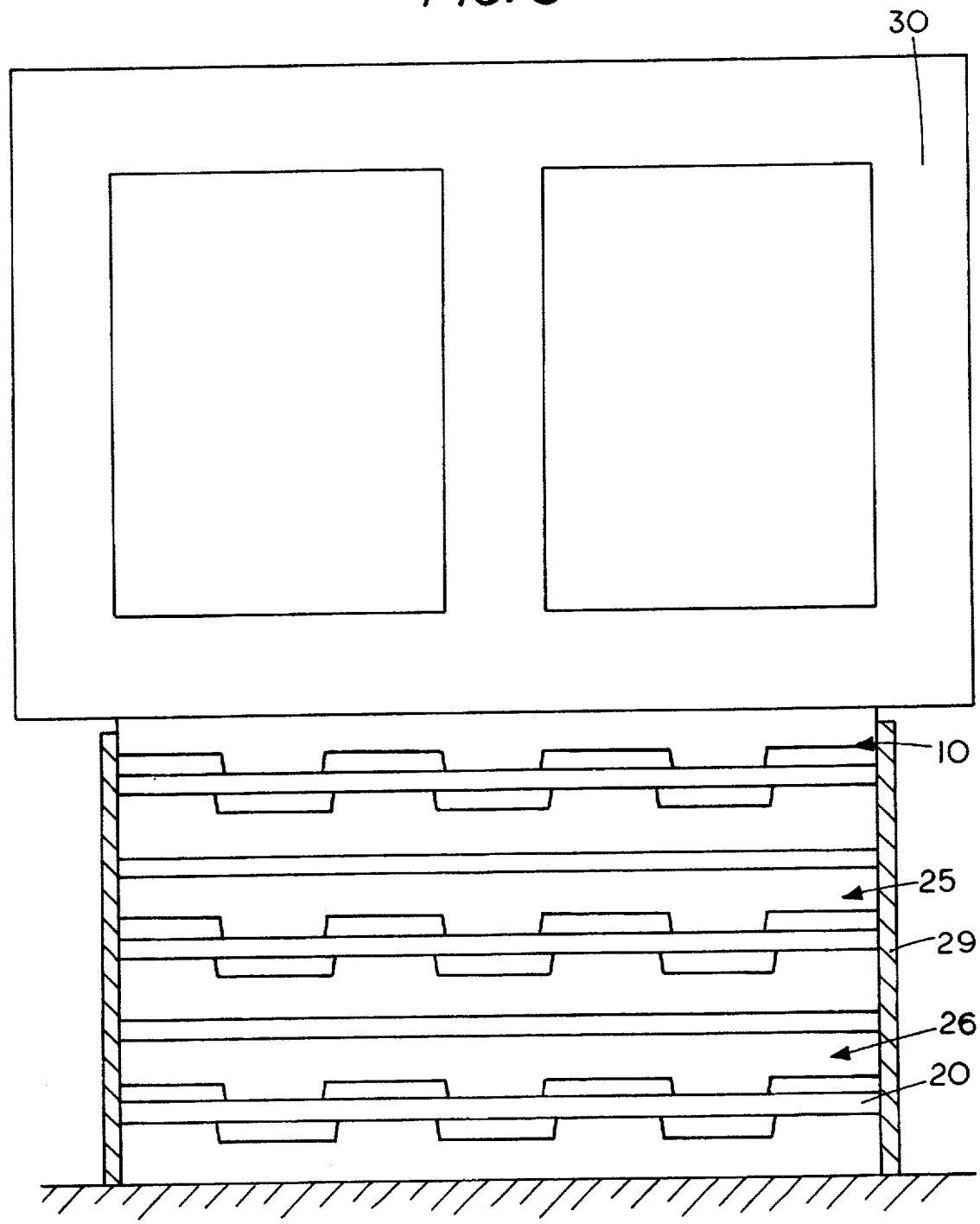

RIDGED ELASTOMER MOUNT

FIELD OF THE INVENTION

This invention relates to shock isolators and, more specifically, to an elastomer mount that can provide offset compressive support, tension support and shear support for an article.

BACKGROUND OF THE INVENTION

Various elastomeric materials have been used, or suggested for use, to provide shock and/or vibration damping as stated in U.S. Pat. No. 5,766,720, which issued on Jun. 16, 1998 to Yamagisht, et al. These materials include natural rubbers and synthetic resins such as polyvinyl chlorides, polyurethane, polyamides polystyrenes, copolymerized polyvinyl chlorides, and poloyolefine synthetic rubbers as well as synthetic materials such as urethane, EPDM, styrene-butadiene rubbers, nitrites, isoprene, chloroprenes, propylene, and silicones. The particular type of elastomeric material is not critical but urethane material sold under the trademark Sorbothane® is currently employed. Suitable material is also sold by Aero E.A.R. Specialty Composites, as Isoloss VL. The registrant of the mark Sorbothane® (for urethane material is the Hamiltion Kent Manufacturing Company (Registration No. 1,208,333), Kent, Ohio 44240.

Generally, the shape and configuration of elastomeric isolators have a significant effect on the shock and vibration attenuation characteristics of the elastomeric isolators. The elastomeric isolators employed in the prior art are commonly formed into geometric 3D shapes, such as spheres, squares, right circular cylinders, cones, rectangles and the like as illustrated in U.S. Pat. No. 5,776,720. These elastomeric isolators are typically attached to a housing to protect equipment within the housing from the effects of shock and vibration.

The prior art elastomeric isolators are generally positioned to rely on an axial compression of the elastomeric material or on tension or shear of the elastomeric material. Generally, if the elastomeric isolator is positioned in the axial compressive mode the ability of the elastomeric isolator to attenuate shock and vibration is limited by the compressive characteristics of the material. On the other hand, in the axial compressive mode the elastomeric isolators can be used to provide static support to a housing, which allows a single elastomeric isolator to be placed beneath the housing to support the static weight of the housing.

In general, if the elastomeric isolators are positioned in the shear or tension mode as opposed to an axial compression mode the elastomeric isolators provide better shock and vibration attenuating characteristics in response to dynamic forces due to shock and vibration. Unfortunately, elastomeric isolators, which operate in a shear or tension mode or in the axial compression mode, can generally not be placed beneath a housing to provide static support to the housing without substantially effecting the shock and vibration attenuation characteristics of the elastomeric isolators. Consequently, to provide static support for a housing, as well as effective shock and vibration attenuation characteristics the elastomeric isolators, which operate in the shear or tension mode, are generally placed along side or above a housing so that the elastomeric isolators can function in a shear or tension mode while supporting the static weight of the housing. The positioning in a shear or tension mode can require placing matching elastomeric isolators on each side of the housing.

The present invention provides an elastomeric mount or isolator that provides compressive support for a housing, and the compressive support in relation to the shear support can be preselected by utilization of ridged plates. The present invention does not require paring with other shock isolators so a single shock isolator can be placed beneath a housing to provide static support for the housing while at the same time allowing the elastomeric sheet in the shock isolator to provide dynamic attenuation characteristics through shear and tension forces on the elastomeric sheet If desired a set of shock isolators can be stacked on each other to provide a platform for supporting an article in a condition wherein the shock and vibration forces are attenuated by the shear and tension resistance of the elastomeric sheet.

SUMMARY OF THE INVENTION

A shock isolator comprising a first plate having a set of ridges and grooves extending there along and a second plate having a complementary set of ridges and grooves with an elastomeric sheet sandwiched between the two plates so that when a compressive force is applied to the two plates the elastomeric sheet resists the compressive force through an offset in the compressive path through the elastomer sheet and through tension resistance and shear resistance to provide both static support and shock isolation to an object supported by the shock isolator.

DESCRIPTION OF THE DRAWINGS

FIG. 3 is a front view showing three of the shock isolators of FIG. 1 in a stacked condition supporting a cabinet to be protected from shock and vibration forces.

DESCRIPTION OF THE PREFERRED EMBODIMENT

Figure 1:
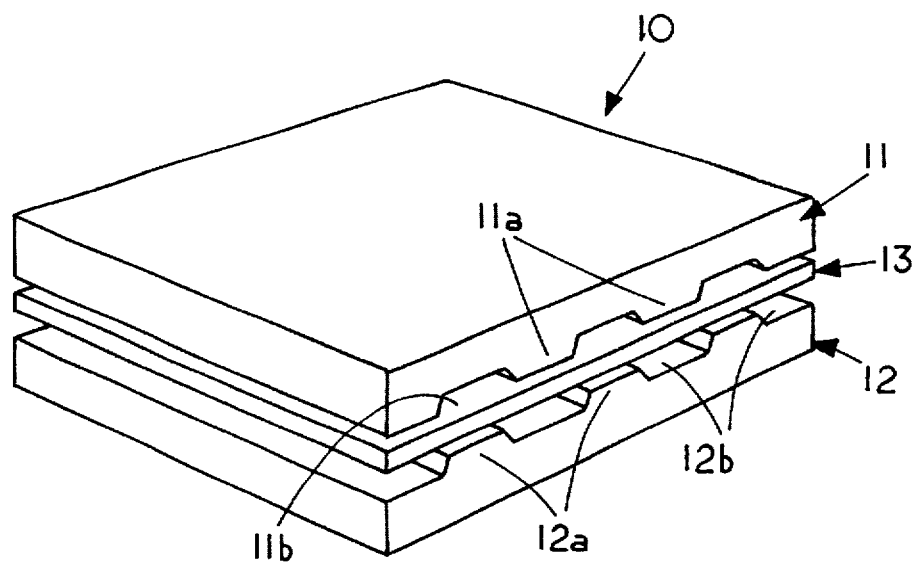
FIG. 1 shows a perspective view of shock isolator.

FIG. 1 shows a perspective view of a shock isolator 10 having a first rigid plate 11 containing an integral set of elongated parallel protrusions 11a and an integral set of elongated parallel recesses 11b which coact to form a top ridged plate 11. Located beneath rigid plate 11 is a second rigid plate 12 having a complementary set of elongated parallel protrusions 12a and a complementary set of elongated parallel recesses 12b. That is the width of a recess 12b is such that the protrusion 11a on plate 11 will mate or fit within the recess 12b if the first plate 11 and second plate 12 are brought together. Similarly, the width of protrusion 12a is such that it fits within recess 11b of plate 11 if the first plate 11 and second plate 12 are brought together.

Located between plates 11 and 12 is an elastomer sheet 13. The elastomer sheet 13 extends in a sandwich fashion laterally between the protrusions 11a and recesses 11b of first plate 11 and the complementary recesses 12b and complementary protrusions 12a of the second plate 12. In the embodiment shown the elastomer sheet 13 is maintained in a relaxed or unstretched condition when there is no compressive force against plate 11 or plate 12. When a compressive force is applied to first plate 11 and to second plate 12 the elastomer sheet 13 not only resists the motion of the plates but the plates act to frictionally hold the elastomer sheet 13 in a lateral position causing localized stretching of the elastomeric sheet 13 which results in both shear and tension forces within sheet 13 which not only resists a displacement of the first plate 11 toward the second plate 12 but provides enhanced shock and vibration attenuation characteristics to isolator 10. In addition, if a displacement of plates 11 and 12 with respect to each other should cause both sides of elastomer sheet 13 to be compressed against the two opposing plates the elastomer sheet will act as a cushion to cushionly limit further displacement. Thus, the present invention not only provides shock and vibration attention but cushionly limits the displacement of the two plates with respect to each other in the event of an excess displacement of the plates.

Figure 2:
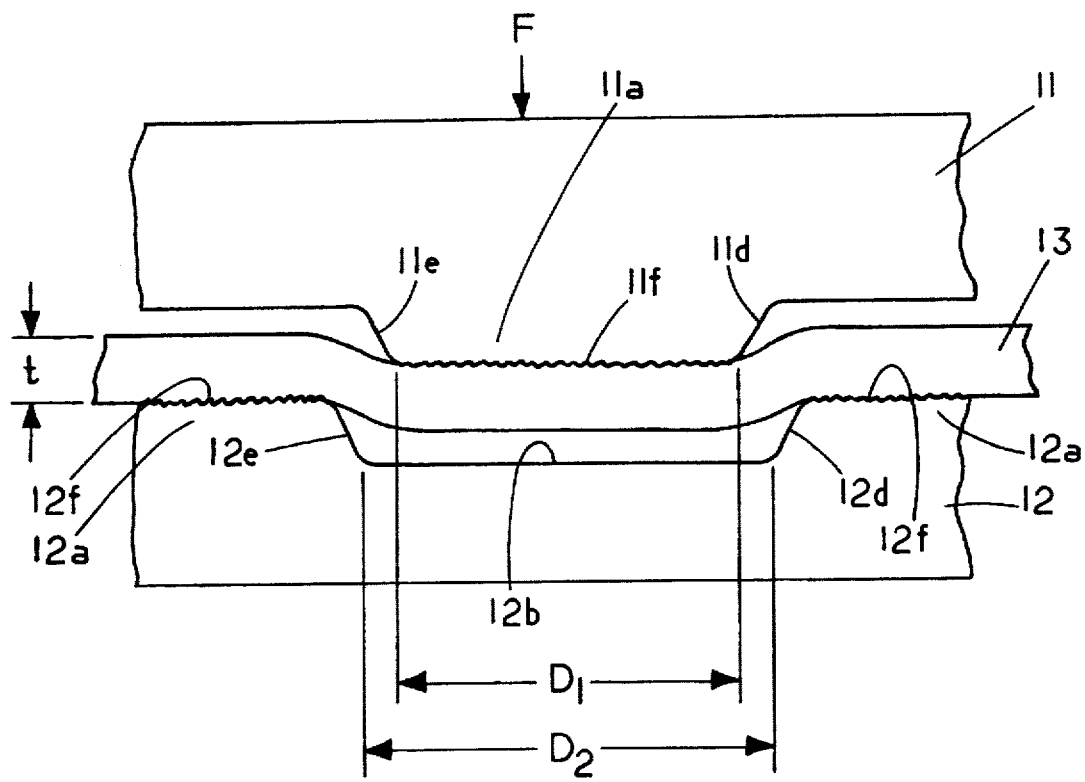
FIG. 2 is an enlarged partial end view of a portion of the shock isolator of FIG. 1.

FIG. 2 is an enlarged partial end view of a portion of the shock isolator 10 showing portion 11a having a width indicated by $D_1$ and the complementary recess on plate 12 having a width indicated by $D_2$. The distance $D_2$ is sufficiently greater than the width $D_1$ so that when an elastomer sheet 13 is forced therebetween there is sufficient room so as not to pinch the elastomer sheet 13 between sidewall 11d of protrusion and sidewall 12d of complementary recess 12b or between sidewall 11e of protrusion 11c and sidewall 12e of recess 12b. In general the difference between $D_2$ and $D_1$ is such that it is at least equal to or greater than twice the thickness "t" of elastomer sheet 13.

In order to hold elastomer sheet 13 in position there is provided high friction surfaces on both plates 11 and 12. Referring to FIG. 2, protrusion 11 has a high friction surface 11f. Similarly, each of protrusions 12a have a high friction surface 12f. The high friction surfaces can comprises a knurled surface or the like or can include a separate material to provide frictional resistance to inhibit lateral displacement of elastomer sheet 13 with respect to plates 11 and 12.

In order to prevent accidental tearing of an elastomer sheet 13 as the rigid plates 11 and 12 are brought together by static or dynamic forces each of the corners of the protrusions and recess are rounded as illustrated in FIG. 2. It will be understood that the need for rounded corners depends on the type of elastomer sheet selected as some elastomer sheets are more tear resistance than others.

FIG. 2 illustrates the multiple responsive action of isolator 10 in response to a force F on plate 11. The force F displaces plate 11 toward plate 12 causing the elastomer sheet 13 to conform to the gap between the protrusions and recesses on plate 11 and the complementary protrusions and recesses on plate 12. Elastomer sheet 13 is shown with a portion of sheet 13 in contact with high friction surface 11f, and further portions in contact with high friction surfaces 12f. The high frictional surface restrains elastomer sheet 13 from sliding laterally inward to smoothly follow the contours between the protrusions and recess of plates 11 and 13. Instead, as a result of the frictional surfaces the elastomer sheet is locally held in position, which results in placing the elastomer sheet in tension and shear, as the protrusions and recesses of plate 11 move toward the complementary protrusions and recesses of plate 12. Thus the elastomer sheet 13 provides both tension and shear resistance since the elastomer sheet is both stretched and bent as it is forced to follow the contours of the two mating plates. While the tension and shear resistance provide excellent shock and vibration attenuation characteristics the elastomer sheet 13 also provides compressive resistance to the squeezing between plates 11 and 12 to thereby provide static support for a cabinet or the like.

FIG. 3 shows an application of the isolator 10 in supporting a cabinet or housing 30. In the embodiment shown a first isolator 10 is stacked on top of a second identical isolator 25 which is in tun stacked on top of a third identical isolator 26. As isolators 10, 25 and 26 are identical to each other they will not be described herein. A housing 29 shown in section surrounds each of isolators 10, 25 and 26 to maintain the elastomer sheets between the opposing plates of each of the isolators. As an alternate embodiment the elastomer sheets could be pegged or pinned to prevent the lateral creeping of the elastomer sheet as the system is subject to shock and vibration.

Thus the present invention includes the method of providing a compressive support while providing elastomeric tensional resistance to a compressive load by 1) forming a set of elongated parallel protrusions 11a and a set of elongated parallel recesses 11b in a first plate 11. 2) forming set of complementary elongated parallel protrusions 12a and complementary elongated parallel recess 12b in second plate 12. 3) placing an elastomer sheet 13 between the first plate 11 and the second plate 12 so that the elastomer sheet 13 is sandwiched therebetween.

In addition the method can include the step of forming rounded corners on the protrusions and recess to inhibit tearing of the elastomer sheet 13. To prevent slipping of elastomer sheet 13 the method of the invention can include the step of forming high frictional surfaces 11f on protrusions 11a and high frictional surfaces 12f on complementary protrusions 12a to inhibit lateral sliding of elastomer sheet 13 between the first plate 11 and the second plate 12. The method of the invention can also include the step of forming each of the protrusions 11a on first plate 11 of a width $D_1$ that is less than a width $D_2$ of the complementary recess 12b in the second plate 12 where the difference between $D_1$ and $D_2$ is an amount that is equal or greater than twice the thickness "t" of elastomer sheet 13.

We claim:

1. An shock and vibration absorbing mount comprising:
   a first plate said first plate having a protrusion and recess therein;
   a second plate said second plate having a complementary protrusion to the recess of said first plate and a complementary recess to the protrusion of said first plate;
   an elastomer sheet, said elastomer sheet extending between the protrusion and recess of said first plate and the complementary recess and complementary protrusion of said second plate so that when a compressive force is applied to said first plate and said second plate said elastomer sheet tensionally resists a displacement of said first plate toward said second plate.

2. The shock and vibration absorbing mount of claim 1 wherein said first plate includes a set of protrusions and recesses and said second plate includes a set of complementary protrusions and complementary recess.

3. The shock and vibration absorbing mount of claim 1 wherein said protrusion of said first plate and said complementary protrusion of said second plate comprise elongated members.

4. The shock and vibration absorbing mount of claim 1 wherein said protrusion of said first plate includes a high frictional surface to inhibit lateral slipping of said elastomer sheet therepast.

5. The shock and vibration absorbing mount of claim 4 wherein said complementary protrusion of said second plate includes a high frictional surfaces to inhibit lateral slipping of said elastomer sheet therepast.

6. The shock and vibration absorbing mount of claim 1 where both of said first plate and said second plate are rigid plates.

7. The shock and vibration absorbing mount of claim 1 including at least four sets of plates and at least two elastomer sheets arranged in a stacked condition to provide shock and vibration attenuation through tension and shear resistance of the elastomer sheet while also providing compression support.

8. The shock and vibration absorbing mount of claim 1 wherein the protrusion of said first plate has a width that is smaller than a complementary recess in a second plate by an amount at least equal to twice a thickness "t" of the elastomer sheet.

9. The shock and vibration absorbing mount of claim 1 wherein the protrusion in said first plate has a first rounded corner and a second rounded corner to inhibit tearing of said elastomer sheet and said complementary recess in said second plate includes a first rounded corner and a second rounded corner to inhibit tearing of said elastomer sheet.

10. The shock and vibration absorbing mount of claim 1 including a housing for maintaining said elastomer sheet between said first plate and said second plate.

11. The method of providing a compressive support while providing elastomeric tensionally resistance to a compressive load comprising:

forming a set of elongated protrusions and a set of elongated recesses in a first plate;

forming a set of complementary protrusions and a set of complementary recesses in said second plate; and placing an elastomer sheet between said first plate and said second plate so that the elastomer sheet is sandwiched therebetween to thereby provide tension and shear resistance as the first plate is displaced toward the second plate.

12. The method of claim 11 including the step of forming rounded corners on each of said set of protrusions and each of said set of recesses to inhibit tearing of said elastomer sheet.

13. The method of claim 12 including the step of forming high frictional surfaces on each of said set of protrusions and said each of said set of complementary protrusions to inhibit sliding of said elastomer sheet between the first plate and the second plate.

14. The method of claim 13 including the step of forming each of the protrusions on said first plate of a width that is less than a width of the complementary recess in the second plate in an amount equal to twice a thickness "t" of the elastomer sheet.

* * * * *